United States Patent
Srinivas

(10) Patent No.: US 10,362,630 B2
(45) Date of Patent: Jul. 23, 2019

(54) AIRTIME EFFICIENCY OF VIRTUAL CELL BY OPTIMIZING MULTICAST/BROADCAST TRANSMISSIONS IN WIRELESS NETWORKS

(71) Applicant: Fortinet, Inc., Sunnyvale, CA (US)

(72) Inventor: Geethanjali Srinivas, Karnataka (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/721,905

(22) Filed: Sep. 30, 2017

(65) Prior Publication Data

US 2019/0104418 A1 Apr. 4, 2019

(51) Int. Cl.

| H04W 76/40 | (2018.01) |
|---|---|
| H04W 4/06 | (2009.01) |
| H04W 72/00 | (2009.01) |
| H04W 24/02 | (2009.01) |
| H04L 12/18 | (2006.01) |
| H04W 48/10 | (2009.01) |
| H04W 28/16 | (2009.01) |
| H04W 16/24 | (2009.01) |
| H04W 84/12 | (2009.01) |

(52) U.S. Cl.
CPC ............ *H04W 76/40* (2018.02); *H04L 12/18* (2013.01); *H04L 12/1886* (2013.01); *H04W 4/06* (2013.01); *H04W 24/02* (2013.01); *H04W 28/16* (2013.01); *H04W 48/10* (2013.01); *H04W 72/005* (2013.01); *H04L 12/189* (2013.01); *H04W 16/24* (2013.01); *H04W 84/12* (2013.01)

(58) Field of Classification Search
CPC ....... H04W 4/02; H04W 4/023; H04W 4/025; H04W 4/029; H04W 4/06; H04W 72/005; H04W 76/40; H04W 28/16; H04W 48/10; H04W 24/02; H04W 84/12; H04W 16/24; H04W 36/0007; H04L 12/18; H04L 12/1845; H04L 12/185; H04L 12/1886; H04L 12/189; H04L 47/781; H04L 47/762

See application file for complete search history.

(56) References Cited

U.S. PATENT DOCUMENTS

| 2007/0195727 A1* | 8/2007 | Kinder ................... H04L 41/00 370/328 |
| 2016/0345258 A1* | 11/2016 | Zhou ................. H04W 52/0206 |

* cited by examiner

*Primary Examiner* — Joshua Kading
(74) *Attorney, Agent, or Firm* — Law Office of Dorian Cartwright; Dorian Cartwright

(57) ABSTRACT

Airtime efficiency is improved in virtual cell by optimizing multicast and/or broadcast transmissions in wireless networks with an optimal set of access points, as a subset of total access points involved in a traditional transmission. An optimal set comprising singleton access points and a minimum number of non-singleton access points covering the maximum number of stations with the fewest number of access points by including a non-singleton access point covering a highest number of stations not covered by the singleton access points are identified. The remaining access points in the plurality of access points that are not part of the optimal set, are configured to refrain from the inherent virtual cell rule of responding to multicast or broadcast on the Wi-Fi portion of the Wi-Fi data communication network.

4 Claims, 7 Drawing Sheets

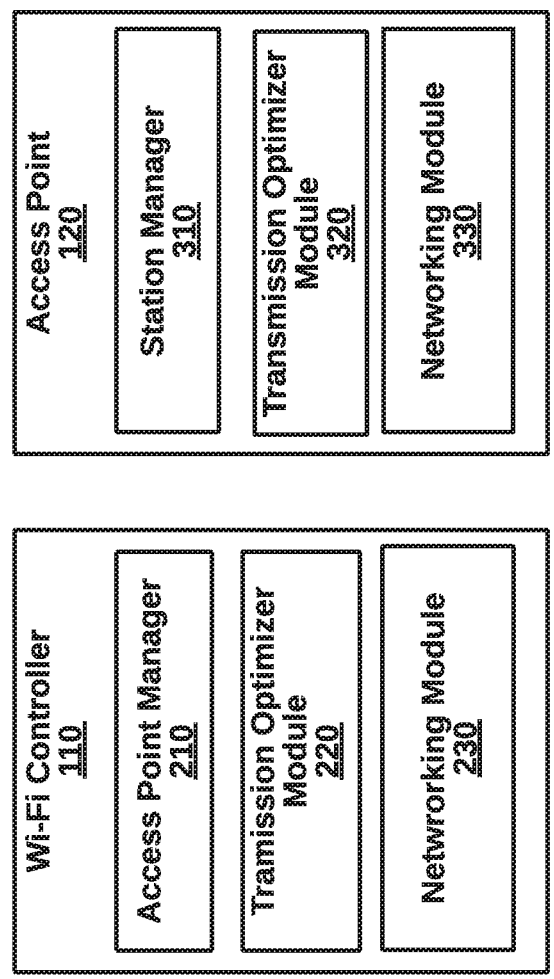

US 10,362,630 B2

AIRTIME EFFICIENCY OF VIRTUAL CELL BY OPTIMIZING MULTICAST/BROADCAST TRANSMISSIONS IN WIRELESS NETWORKS

FIELD OF THE INVENTION

The invention relates generally to computer networking improvements, and more specifically, to improving airtime efficiency of virtual cell by optimizing multicast/broadcast transmissions in wireless networks.

BACKGROUND

Virtual cell is a roaming service available to wireless networks to improve roaming for stations that are connected. To do so, several access points use a common BSSID (basic service set identifier) so that transitions between access points, as a mobile user moves around a network, are mostly transparent to a station.

Problematically, multicast and broadcast transmissions received for distribution to a common BSSID are repeated at each of the included access points. More specifically, multicast transmissions to a set of particular stations or broadcast transmissions to all stations are completed by each access point. Each access point is consequentially consumed with resource allocations, even though some of the stations will receive the transmissions more than once. This is because access points are distributed around a physical location to prevent dead areas, while at the same time, creating areas of overlap between two or more access point ranges.

Therefore, what is needed is a robust optimization technique to reserve resources by refraining from transmitting the same packets from overlapping access point ranges, while also covering all intended recipient stations.

SUMMARY

These shortcomings are addressed by the present disclosure of methods, computer program products, and systems for reporting log events for improving airtime efficiency of virtual cell by optimizing unicast/broadcast transmissions in wireless networks.

In one embodiment, singleton access points that service a single station of a plurality of stations oh the Wi-Fi data communication network are identified. Other stations within range of wireless transmissions from the singleton access points are also identified.

In another embodiment, a minimum number of non-singleton access points covering the maximum number of stations with the fewest number of access points by including a non-singleton access point covering a highest number of stations not covered by the singleton access points are identified. Additional, non-singleton access points, not within the optimal set and covering the maximum number of stations are also identified recursively, until each of the plurality of subject stations are covered. The optimal set of access points, as a subset of the plurality of access points, with the identified singleton access points and the identified non-singleton access points is formed. To do so, the optimal set of access points are configured for response to multicast or broadcast packets for transmission to stations on a Wi-Fi portion of the Wi-Fi data communication network. The remaining access points in the plurality of access points that are not part of the optimal set, can also be configured to refrain from the inherent virtual cell rule of responding to multicast or broadcast on the Wi-Fi portion of the Wi-Fi data communication network.

Advantageously, overall network and network component performance is improved, yielding a better experience for stations and end users.

BRIEF DESCRIPTION OF THE FIGURES

In the following figures, like reference numbers are used to refer to like elements. Although the following figures depict various examples of the invention, the invention is not limited to the examples depicted in the figures.

FIGS. 2-3 are more detailed block diagrams illustrating internal components of a controller and access points from the system of FIG. 1, according to some embodiments.

DETAILED DESCRIPTION

The present invention provides methods, computer program products, and systems for reporting log events for improving airtime efficiency of virtual cell by optimizing unicast/broadcast transmissions in wireless networks. One of ordinary skill in the art will recognize that many other scenarios are possible, as discussed in more detail below. For example, the disclosed techniques can apply to wireless networks other than Wi-Fi, such as Bluetooth or hybrid wireless networks, to mesh Wi-Fi networks, or other alternatives.

Systems to Improve Virtual Cell Airtime Efficiency (FIGS. 1-3)

Figure 1A:
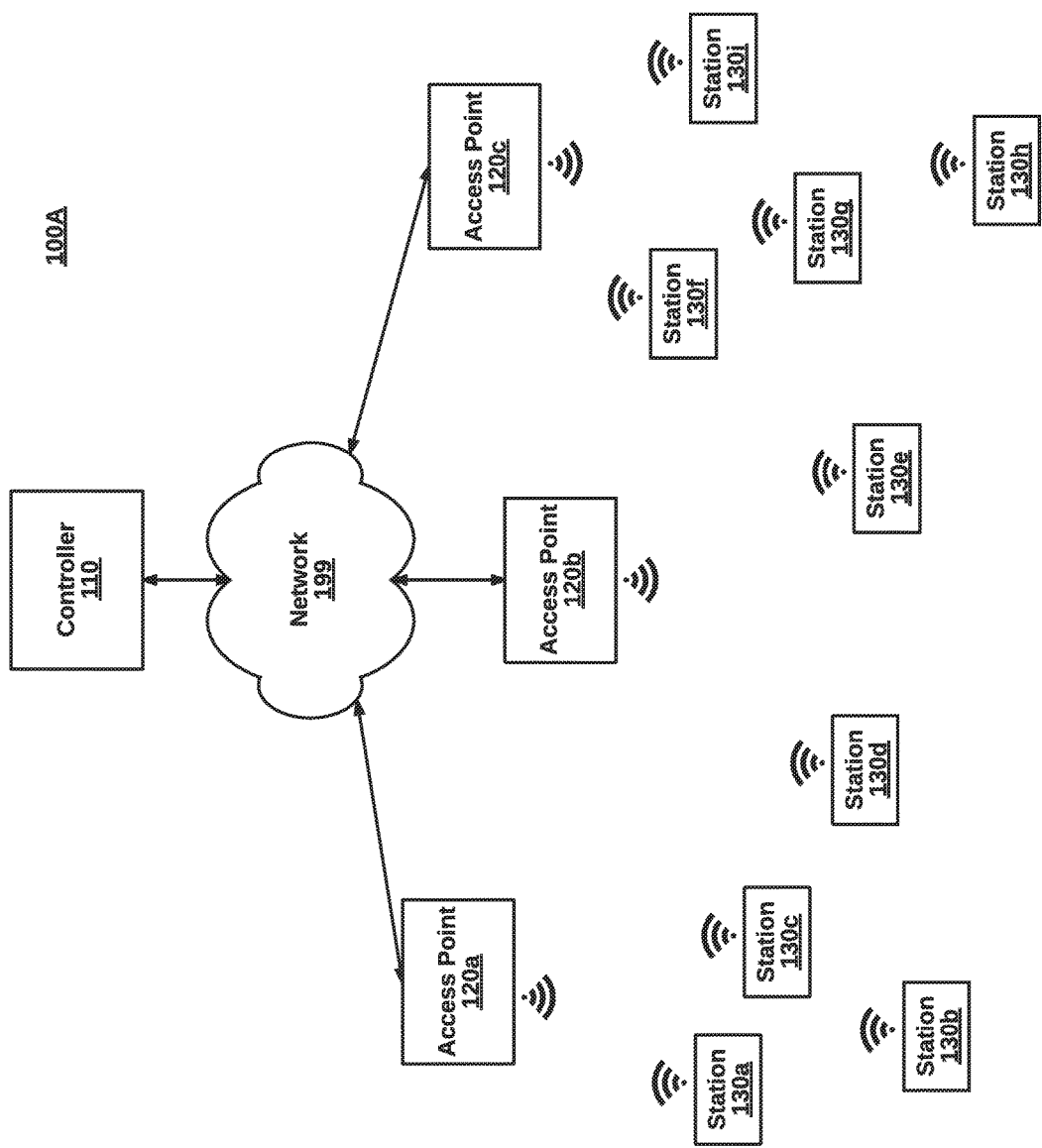
FIGS. 1A-1C are high-level block diagram illustrating a system to improve airtime efficiency of virtual cell by optimizing unicast/broadcast transmissions in wireless networks, in various modes, according to one embodiment.
Figure 1B:
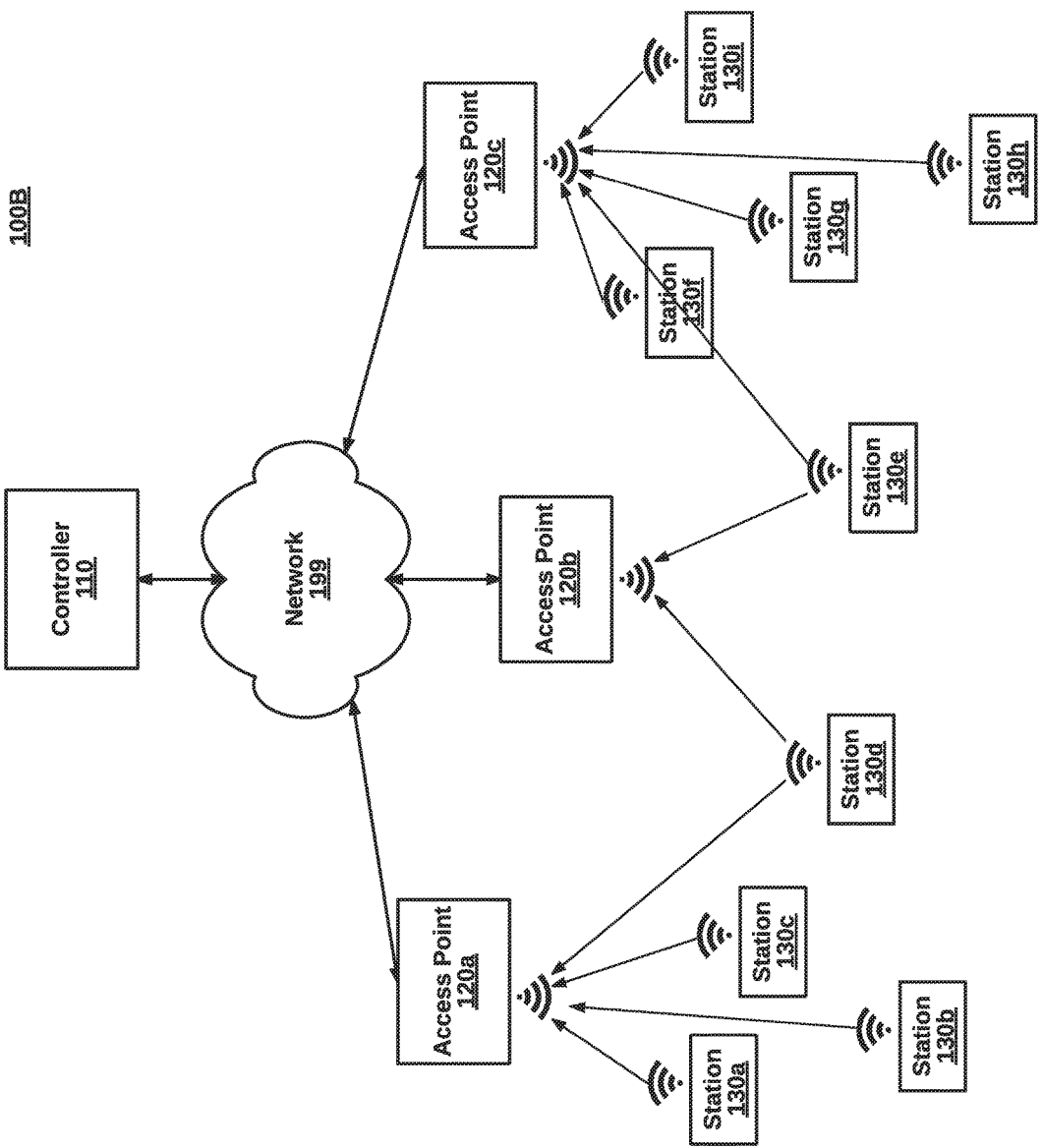
Figure 1C:
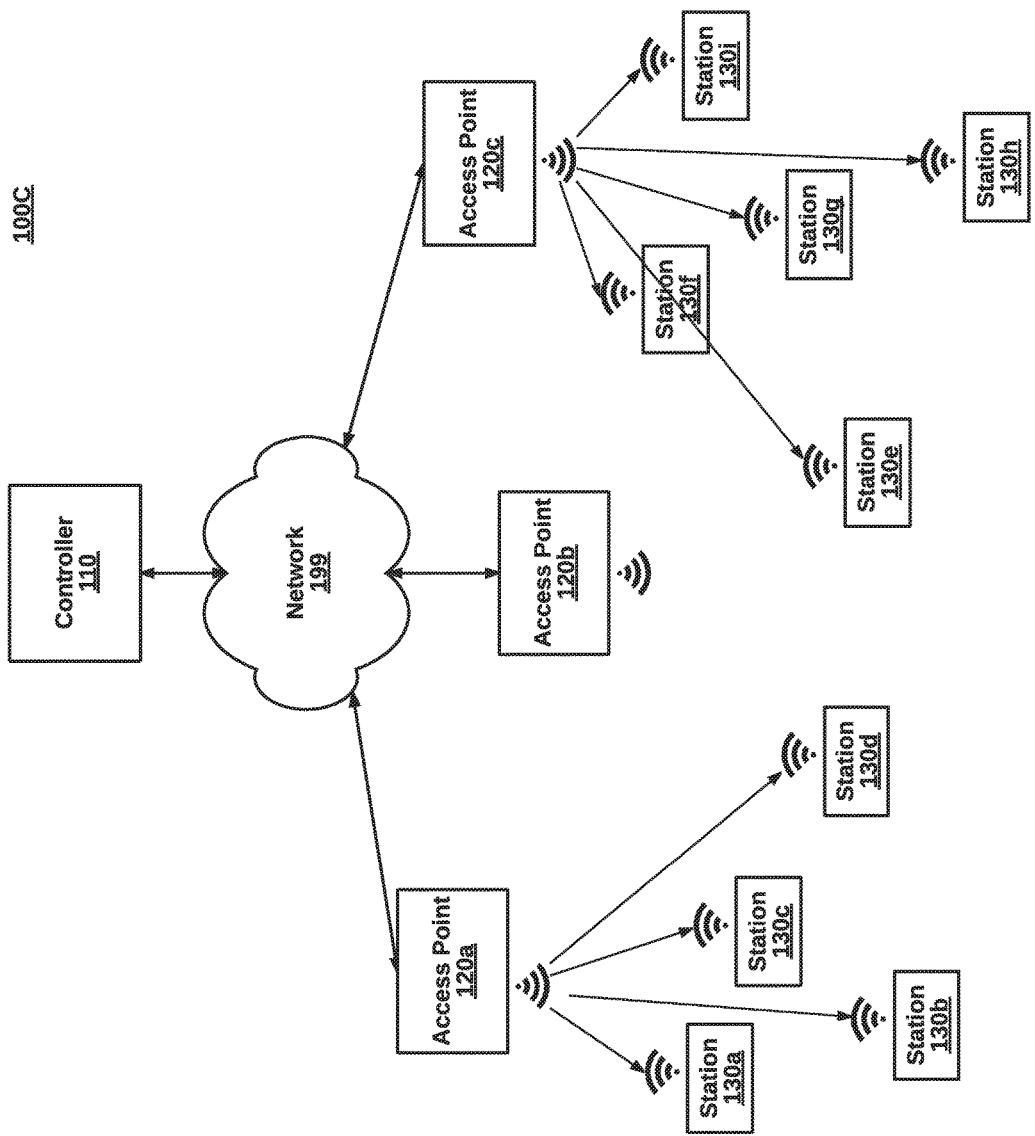

FIGS. 1A-1C are high-level block diagram illustrating a system to improve airtime efficiency of virtual cell by optimizing unicast/broadcast transmissions in wireless networks. The system 100 comprises a controller 110, access points 120a-c and stations 130a-i. Other embodiments are possible. The access points 120a-c present a virtual cell to the stations 130a-i having a common BSSID.

An optimal group of access points, as a subset of access points 120a-c will participate in a particular broadcast or multicast (see FIG. 1B), regardless of non-optimal access points that are also serving stations designated to receive the transmissions (see FIG. 1C).

In more detail, access points 120a and 120b are considered optimal, because although stations 130d and 130e are serviced by access point 120b, a particular multicast or broadcast can be accomplished without access point 120b. Instead, access points 120a and 120c and proxy for access point 120b in a virtual cell environment using the same BSSID, when within radio range. Otherwise, access point 120b could be wasting resources by sending duplicative packets rather than performing other time, processor or memory-intensive processes. The optimal set can be updated responsive to station movement, changing RSSI values, time expiration, a new subject transmission, low quality of service, current loads at a processor (number of stations, processor or memory or bandwidth load, queue capacity, or the like. Other triggers are also possible.

One embodiment uses a minimum RSSI level to determine whether a station is within range of a particular access point. Periodic updates can be sent from access points to a controller with station contacts, whether being serviced or not. Other algorithms can overrule, or make even more efficient, the optimal set. For example, recursively adding the access point reaching the maximum number of stations, sets of two access points can be analyzed for combined reach of stations. In some implementations, probability analysis can be used to provide real-time group formations without real-time coverage data. Other variations are also possible.

The Wi-Fi controller 110 provides virtual cell service by assigning a common BSSID to more than one access point. When a station changes locations to one served by a different access point, disassociation from a source access point and reassociation to a destination access point is not necessary, and a fast transition between access points is possible. From another perspective, the Wi-Fi controller 110 changes assignments of which access point should respond to a particular station.

Figure 6:
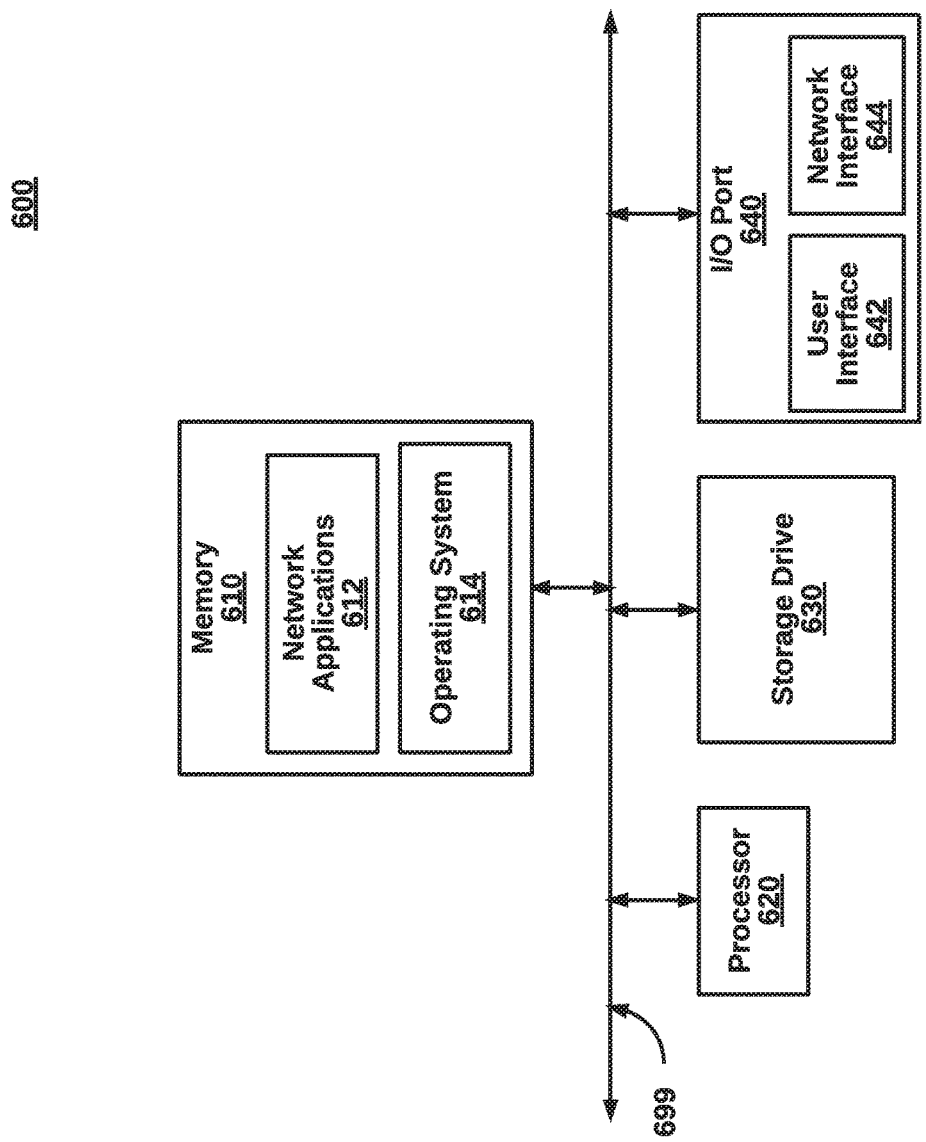
FIG. 6 is a block diagram illustrating an example computing device, according to one embodiment.

The Wi-Fi controller 110 can be implemented in any of the computing devices discussed herein (e.g., see FIG. 6). For example, the cloud-based Wi-Fi controller 140 can be an MC1500 or MC6000 device (e.g., modified) by Fortinet Networks of Sunnyvale, Calif. Additional functionalities of the Wi-Fi controller 110 include management of the access points 120A,B. Further, virtual cell and virtual port services leverage the network-wide view of the system 100 available to the Wi-Fi controller 110. More embodiments of the cloud-based Wi-Fi controller 110 are discussed with respect to FIG. 2.

The access points 120a,b physically include one or more individual access points implemented in any of the computing devices discussed herein (e.g., see FIG. 6). For example, the access point 130 can be an AP 110 or AP 433 (modified as discussed herein) by Fortinet of Sunnyvale, Calif. A network administrator can strategically place the access point 130 for optimal coverage area over a locale. The access point 130 can, in turn, be connected to a wired hub, switch or router connected to the enterprise network 199 (or an external network). In embodiment, access point functionality is incorporated into a switch or router. In another embodiment, the access points 120a,b are virtual devices. Further embodiments of the access points 120a,b are discussed with respect to FIG. 3.

Network 199 provides a data channel for components of the system 100. Specifically, (wireless) stations 130a-i can be communicatively coupled by Wi-Fi to access points 120a-c which have a wired connection to the network 199 along with controller 110.

Generally, the stations 130a-i of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating the Wi-Fi controller 110, according to one embodiment. The Wi-Fi controller 110 includes an access point manager 210 to monitor and manage commands to access points, for instance, in maintaining virtual cell service to roaming stations. A networking module 330 uses APIs, networking protocols, hardware and software (e.g., I/O ports and radios) to communicate with external network devices such as the access points 120A-C.

A transmission optimizer module 220, in various configurations, can provide a user interface to receive user configurations and report activity. In one case, a particular broadcast or multicast can have a specific optimal set that deviates from a default optimal set determination. Tables can correlate each access point to current stations within range (or historical stations within range). The transmission optimizer module 220 can trigger updates and make provisions for anticipated subject transmissions, in some embodiments.

FIG. 3 is a more detailed block diagram illustrating a collector node 120 (collectively representing the collector nodes 120A-B) of the system 100, according to one embodiment. The access point 120 includes station manager 310 tracks individual stations roaming within a virtual cell. A networking module 330 uses APIs, networking protocols, hardware and software (e.g., I/O ports and radios) to communicate with external network devices such as the Wi-Fi controller 110 and the stations 120a-i.

Figure 4:
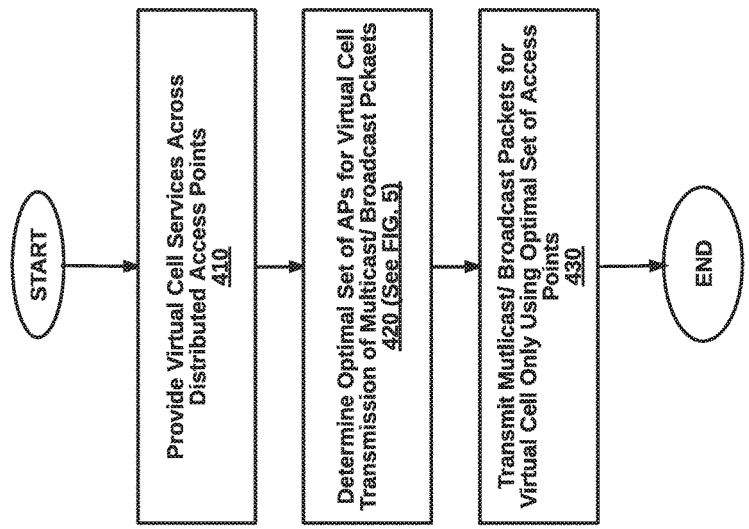
FIG. 4 is a high-level flow diagram illustrating a method for improving airtime efficiency of virtual cell by optimizing unicast/broadcast transmissions in wireless networks, according to one embodiment.
Figure 5:
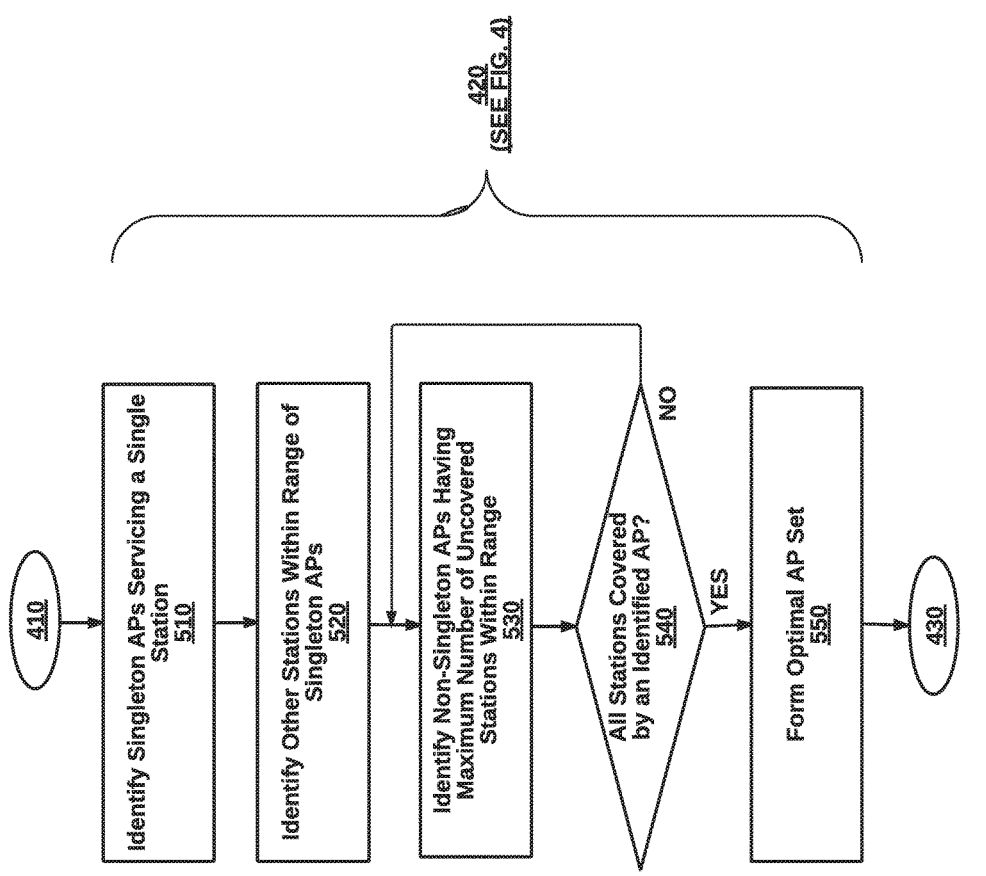
FIG. 5 is a more detailed flow diagram illustrating a step of, analyzing feasibility of user location changes based on actual transport modes available, from the method of FIG. 5, according to one embodiment.

Methods for Improving Virtual Cell Airtime Efficiency (FIGS. 4-5)

FIG. 4 is a high-level flow diagram illustrating a method 400 for tracking of users and devices at collector nodes, according to one embodiment. The method 400 can be implemented by the system 100 of FIGS. 1A-C or a different system. One of ordinary skill in the art will recognize that the method 400 is non-limiting as other embodiments can have more or less steps and can be performed in a different order.

At step 410, virtual cell services are provided to stations across distributed access points. A step 420, an optimal set of Aps for virtual cell transmission of multicast and/or broadcast packets is determined, as describe further in FIG. 5. At step 430, multicast and/or broadcast packets for virtual cell are transmitted uses only an optimal set of access points, as a subset of total access points servicing stations.

FIG. 5 is a more detailed flow diagram illustrating the step 420, of analyzing feasibility of user location changes based on actual transport modes available, from the method 400, according to one embodiment.

At step 510, singleton access points servicing a single station, of a subject transmission are identified for the optimal set. One embodiment automatically includes singleton access points in the set of optimal access points. At step 520, other stations within range of singleton access points are identified for the optimal set. Then, at step 530, a non-singleton access point having a maximum number of stations within range, rather assigned to service or not, are identified.

At step 540, it is determined whether all stations of a subject transmission have been identified for the optimal set. If so, the optimal set is finalized) If not, step 530 is repeated until all stations are covered by at least one access point of the optimal set. The optimal set can be updated responsive to station movement, changing RSSI values, time expiration, a new subject transmission, low quality of service, or the like.

Generic Computing Device (FIG. 6)

FIG. 7 is a block diagram illustrating an exemplary computing device 700 for use in the system 100 of FIG. 1, according to one embodiment. The computing device 700 is an exemplary device that is implementable for each of the components of the system 100, including the central log manager 110, the collector nodes 120, and the network devices 130A-D. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the central log manager 110, the collector nodes 120, and the network devices 130A-D, as illustrated in FIGS. 1-3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x74 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX74. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM (electronically erasable programmable read-only memory), Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for a controller in a Wi-Fi data communication network for improving efficiency of virtual cell service during multicast or broadcast transmissions from an optimal set of access points managed by the controller to implement the virtual cell service, the method in the controller comprising the steps of:

identifying one or more singleton access points that service a single station of a plurality of stations on the Wi-Fi data communication network;

determining one or more other stations separate from the plurality of stations within range of wireless transmissions from the singleton access points;

identifying a minimum number of non-singleton access points covering a maximum number of stations with the fewest number of access points by including a non-singleton access point covering a highest number of stations not covered by the one or more singleton access points, and continuing to identify non-singleton access points not within the optimal set and covering the maximum number of stations, until each of a plurality of subject stations are covered;

forming the optimal set of access points, as a subset of a plurality of access points, with the identified one or more singleton access points and the identified non-singleton access points;

configuring the optimal set of access points for response to multicast or broadcast packets for transmission to stations on a Wi-Fi portion of the Wi-Fi data communication network; and configuring remaining access points in the plurality of access points that are not part of the optimal set, to refrain from responding to multicast or broadcast on the Wi-Fi portion of the Wi-Fi data communication network.

2. The method of claim 1, further comprising:
updating configurations of the optimal set of access points and the remaining access points responsive to a trigger.

3. The method of claim 1, further comprising:
updating configurations of the optimal set of access points and the remaining access points responsive to a change in assignments for which access point should respond to a particular station.

4. A non-transitory computer-readable medium to, when executed by a processor, perform a computer-implemented method for a controller in a Wi-Fi data communication network for improving efficiency of virtual cell service during multicast or broadcast transmissions from an optimal set of access points managed by the controller to implement the virtual cell service, the method in the controller comprising the steps of:

identifying one or more singleton access points that service a single station of a plurality of stations on the Wi-Fi data communication network;

determining one or more other stations within range of wireless transmissions from the singleton access points;

identifying a minimum number of non-singleton access points covering a maximum number of stations with the fewest number of access points by including a non-singleton access point covering a highest number of stations not covered by the one or more singleton access points, and continuing to identify non-singleton access points not within the optimal set and covering the maximum number of stations, until each of a plurality of subject stations are covered;

forming the optimal set of access points, as a subset of a plurality of access points, with the identified one or more singleton access points and the identified non-singleton access points;

configuring the optimal set of access points for response to multicast or broadcast packets for transmission to stations on a Wi-Fi portion of the Wi-Fi data communication network; and configuring remaining access points in the plurality of access points that are not part of the optimal set, to refrain from responding to multicast or broadcast on the Wi-Fi portion of the Wi-Fi data communication network.

* * * * *